US012712924B1

(12) United States Patent
Savin et al.

(10) Patent No.: US 12,712,924 B1

(45) Date of Patent: Aug. 18, 2026

(54) DETERMINING SUM LENGTH OF HOST AND PATH IN ENCRYPTED HTTP REQUEST MESSAGE

(71) Applicant: Cujo LLC, Covina, CA (US)

(72) Inventors: Filip Savin, Vilnius (LT); Leonardas Marozas, Vilnius (LT)

(73) Assignee: Cujo LLC, Covina, CA (US)

( * ) Notice: Subject to any disclaimer, the term of this patent is extended or adjusted under 35 U.S.C. 154(b) by 27 days.

(21) Appl. No.: 18/737,092

(22) Filed: Jun. 7, 2024

(51) Int. Cl.
*H04L 9/40* (2022.01)
*H04L 67/02* (2022.01)

(52) U.S. Cl.
CPC ........ *H04L 63/306* (2013.01); *H04L 63/0245* (2013.01); *H04L 63/1475* (2013.01); *H04L 67/02* (2013.01)

(58) Field of Classification Search
CPC . G06F 21/604; G06F 21/606; H04L 63/0428; H04L 63/0442; H04L 63/0245; H04L 63/306
See application file for complete search history.

(56) References Cited

U.S. PATENT DOCUMENTS

2011/0231655 A1* 9/2011 Bollay .................. G06F 21/606 713/153
2019/0190950 A1* 6/2019 Senecal .................... G06N 3/09
2024/0048590 A1* 2/2024 Du Toit .............. H04L 63/0442
2024/0396914 A1* 11/2024 Althouse ............... H04L 63/166

FOREIGN PATENT DOCUMENTS

WO WO-2023071958 A1 * 5/2023 ........... H04L 69/164

* cited by examiner

*Primary Examiner* — Chirag R Patel
(74) *Attorney, Agent, or Firm* — Dority & Manning, P.A.

(57) ABSTRACT

An encrypted hypertext transfer protocol (HTTP) connection between a client and a server is intercepted. The encrypted HTTP connection comprises a communication session handshake, and an encrypted HTTP request message. A sum length of an unencrypted host and an unencrypted path in the encrypted HTTP request message is determined by subtracting an unencrypted headers length and an encryption constant from a length of the encrypted HTTP request message.

19 Claims, 14 Drawing Sheets

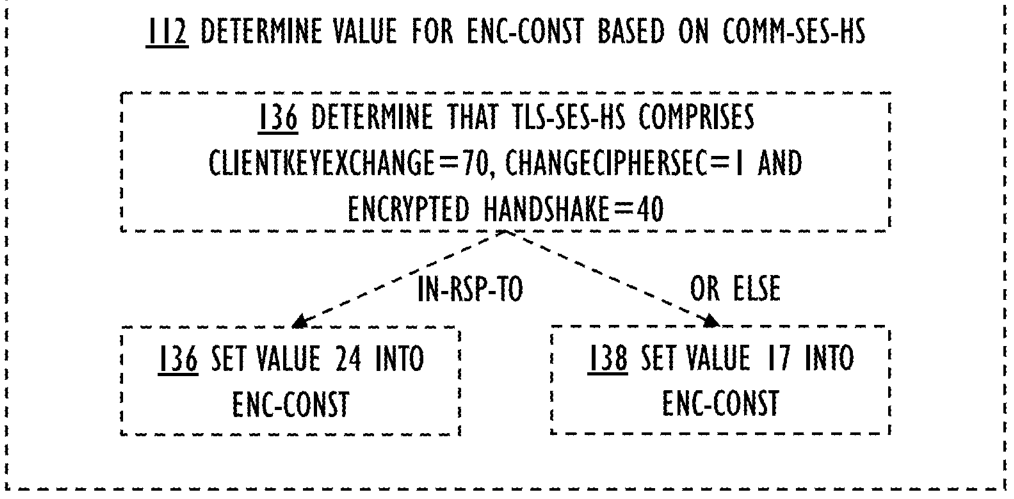
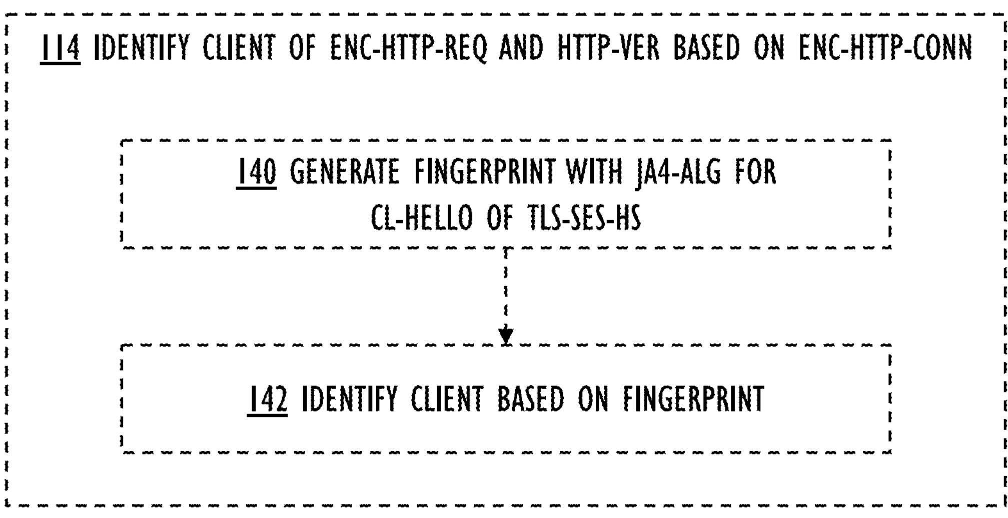
FIG. 1B

200 CONN-DEV
500 UI
502 PROCESSOR
506 WIRELESS TRX
508 SENSORS
504 MEMORY

256 COMP-RES
602 PROCESSOR
604 MEMORY
606 NETWORK IF 280
230 CPE
700 WIRELESS-TRX
706 NW-IF
702 PROCESSOR
252 CS-CLIENT
704 MEMORY 280
230 CPE
710 WLAN-ROUTER
700 WIRELESS TRX
702A PROCESSOR
252 CS-CLIENT
704A MEMORY
726 IF
720 MODEM
706 NW-IF
702B PROCESSOR
704B MEMORY https://test1.cujo-labs.eu/
https://test1.cujo-labs.eu/aaa
https://test1.cujo-labs.eu/aaaaaa
https://test1.cujo-labs.eu/aaaaaaaaa
https://test1.cujo-labs.eu/aaaaaaaaaaaa

800

802

(ip.dst == 128.199.0.240) && (tls.record.opaque_type == 23 || tls.record.content_type == 23 || tls.handshake.type == 1)

| No. | Time | Source Addr | Destination Addre | Length | Info |
|---|---|---|---|---|---|
| 12 | 11:19:43.478872 | 10.7.1.24 | 128.199.0.240 | 512 | Client Hello (SNI=test1.cujo-labs.eu) |
| 24 | 11:19:43.711842 | 10.7.1.24 | 128.199.0.240 | 1,69 | Change Cipher Spec, Application Data |
| 25 | 11:19:43.712322 | 10.7.1.24 | 128.199.0.240 | 166 | Application Data |
| 39 | 11:19:44.261941 | 10.7.1.24 | 128.199.0.240 | 512 | Client Hello (SNI=test1.cujo-labs.eu) |
| 50 | 11:19:44.488285 | 10.7.1.24 | 128.199.0.240 | 1,69 | Change Cipher Spec, Application Data |
| 51 | 11:19:44.488619 | 10.7.1.24 | 128.199.0.240 | 169 | Application Data |
| 63 | 11:19:45.009968 | 10.7.1.24 | 128.199.0.240 | 512 | Client Hello (SNI=test1.cujo-labs.eu) |
| 73 | 11:19:45.258824 | 10.7.1.24 | 128.199.0.240 | 1,69 | Change Cipher Spec, Application Data |
| 74 | 11:19:45.259194 | 10.7.1.24 | 128.199.0.240 | 172 | Application Data |
| 86 | 11:19:45.859357 | 10.7.1.24 | 128.199.0.240 | 512 | Client Hello (SNI=test1.cujo-labs.eu) |
| 95 | 11:19:46.150228 | 10.7.1.24 | 128.199.0.240 | 1,69 | Change Cipher Spec, Application Data |
| 96 | 11:19:46.150660 | 10.7.1.24 | 128.199.0.240 | 175 | Application Data |
| 108 | 11:19:46.680518 | 10.7.1.24 | 128.199.0.240 | 512 | Client Hello (SNI=test1.cujo-labs.eu) |
| 124 | 11:19:46.971152 | 10.7.1.24 | 128.199.0.240 | 1,69 | Change Cipher Spec, Application Data |
| 125 | 11:19:46.971552 | 10.7.1.24 | 128.199.0.240 | 178 | Application Data |

804 https://aaa.cujo-labs.eu/
https://aaaaaa.cujo-labs.eu/
https://aaaaaaaaa.cujo-labs.eu/
https://aaaaaaaaaaaa.cujo-labs.eu/

806

808

(ip.dst == 128.199.0.240) && (tls.record.opaque_type == 23 || tls.record.content_type == 23 || tls.handshake.type == 1)

| No. | Time | Source Addr | Destination Addre | Length | Info |
|---|---|---|---|---|---|
| 190 | 11:36:58.681597 | 10.7.1.24 | 128.199.0.240 | 512 | Client Hello (SNI=aaa.cujo-labs.eu) |
| 200 | 11:36:58.970661 | 10.7.1.24 | 128.199.0.240 | 1,69 | Change Cipher Spec, Application Data |
| 201 | 11:36:58.971202 | 10.7.1.24 | 128.199.0.240 | 164 | Application Data |
| 215 | 11:36:59.597202 | 10.7.1.24 | 128.199.0.240 | 512 | Client Hello (SNI=aaaaaa.cujo-labs.eu) |
| 225 | 11:36:59.888078 | 10.7.1.24 | 128.199.0.240 | 1,69 | Change Cipher Spec, Application Data |
| 226 | 11:36:59.888535 | 10.7.1.24 | 128.199.0.240 | 167 | Application Data |
| 238 | 11:37:00.522154 | 10.7.1.24 | 128.199.0.240 | 512 | Client Hello (SNI=aaaaaaaaa.cujo-labs.eu) |
| 248 | 11:37:00.810352 | 10.7.1.24 | 128.199.0.240 | 1,69 | Change Cipher Spec, Application Data |
| 249 | 11:37:00.810809 | 10.7.1.24 | 128.199.0.240 | 170 | Application Data |
| 272 | 11:37:01.640761 | 10.7.1.24 | 128.199.0.240 | 512 | Client Hello (SNI=aaaaaaaaaaaa.cujo-labs.eu) |
| 283 | 11:37:01.935932 | 10.7.1.24 | 128.199.0.240 | 1,69 | Change Cipher Spec, Application Data |
| 284 | 11:37:01.936331 | 10.7.1.24 | 128.199.0.240 | 173 | Application Data |

```
GET /aaa HTTP/1.1\r\n
Host: aaa.cujo-labs.eu\r\n
User-Agent: python-requests/2.31.0\r\n
Accept-Encoding: gzip, deflate\r\n
Accept: */*\r\n
Connection: keep-alive\r\n
\r\n
```

902

```
GET /aaa HTTP/1.1\r\n
Host: aaa.cujo-labs.eu\r\n
Sec-Fetch-Site: none\r\n
Connection: keep-alive\r\n
Upgrade-Insecure-Requests: 1\r\n
Sec-Fetch-Mode: navigate\r\n
Accept: text/html,application/xhtml+xml,application/xml;q=0.9,*/*;q=0.8\r\n
User-Agent: Mozilla/5.0 (Macintosh; Intel Mac OS X 10_15_7) AppleWebKit/605.1.15
(KHTML, like Gecko) Version/17.2.1 Safari/605.1.15\r\n
Accept-Language: en-US,en;q=0.9\r\n
Sec-Fetch-Dest: document\r\n
Accept-Encoding: gzip, deflate\r\n
\r\n
```

```
GET /aaa HTTP/1.1\r\n
Host: aaa.cujo-labs.eu\r\n
Connection: keep-alive\r\n
sec-ch-ua: "Not A(Brand";v="99", "Google Chrome";v="121",
"Chromium";v="121"\r\n
sec-ch-ua-mobile: ?0\r\n
sec-ch-ua-platform: "macOS"\r\n
Upgrade-Insecure-Requests: 1\r\n
User-Agent: Mozilla/5.0 (Macintosh; Intel Mac OS X 10_15_7) AppleWebKit/537.36
(KHTML, like Gecko) Chrome/121.0.0.0 Safari/537.36\r\n
Accept:
text/html,application/xhtml+xml,application/xml;q=0.9,image/avif,image/webp,image
/apng,*/*;q=0.8,application/signed-exchange;v=b3;q=0.7\r\n
Sec-Fetch-Site: none\r\n
Sec-Fetch-Mode: navigate\r\n
Sec-Fetch-User: ?1\r\n
Sec-Fetch-Dest: document\r\n
Accept-Encoding: gzip, deflate, br\r\n
Accept-Language: en-US,en;q=0.9\r\n
\r\n
```

```
GET /aaa HTTP/1.1\r\n
Host: aaa.cujo-labs.eu\r\n
User-Agent: Mozilla/5.0 (Macintosh; Intel Mac OS X 10.15; rv:120.0)
Gecko/20100101 Firefox/120.0\r\n
Accept:
text/html,application/xhtml+xml,application/xml;q=0.9,image/avif,image/webp,*/*;q
=0.8\r\n
Accept-Language: en-US,en;q=0.5\r\n
Accept-Encoding: gzip, deflate, br\r\n
DNT: 1\r\n
Sec-GPC: 1\r\n
Connection: keep-alive\r\n
Upgrade-Insecure-Requests: 1\r\n
Sec-Fetch-Dest: document\r\n
Sec-Fetch-Mode: navigate\r\n
Sec-Fetch-Site: none\r\n
Sec-Fetch-User: ?1\r\n
\r\n
```

FIG. 9C

| CLIENT | JA4_b | HTTP/1 | HTTP/2 | HTTP/2 | HTTP/3 |
| --- | --- | --- | --- | --- | --- |
| python-requests/2.31.0 | c7886603b240 | 130 | - | - | - |
| curl/8.4.0 | 0d8feac7bc37 | 62 | 64 | 17+9 | - |
| Firefox/122.0 macOS | 5b57614c22b0 | 455 | 148 | 2780+14 +13 | - |
| Safari/17.2.1 | a09f3c656075 | 398 | - | 304 | - |
| Chrome/121.0 macOS | 8daaf6152771 | 647 | 70 | 420+14 | - |
| Chrome/121.0+QUIC macOS | 55b375c5d22e | - | - | - | 450 |

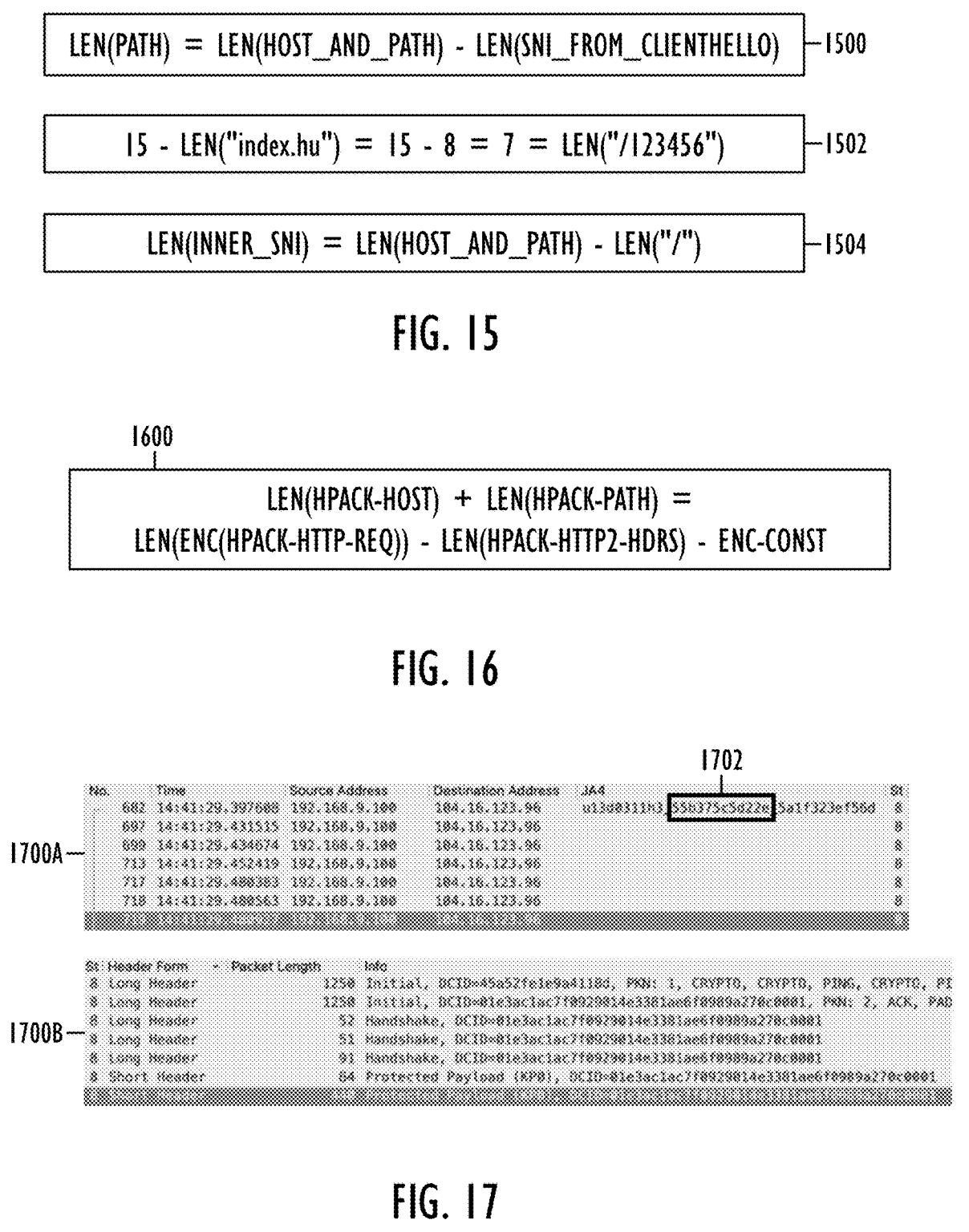

LEN(PATH) = LEN(HOST_AND_PATH) - LEN(SNI_FROM_CLIENTHELLO) — 1500

15 - LEN("index.hu") = 15 - 8 = 7 = LEN("/123456") — 1502

LEN(INNER_SNI) = LEN(HOST_AND_PATH) - LEN("/") — 1504

LEN(HPACK-HOST) + LEN(HPACK-PATH) = LEN(ENC(HPACK-HTTP-REQ)) - LEN(HPACK-HTTP2-HDRS) - ENC-CONST

| No. | Time | Source Address | Destination Address | JA4 | St |
| --- | --- | --- | --- | --- | --- |
| 682 | 14:41:29.397608 | 192.168.9.100 | 184.16.123.96 | u13d0311h3 55b375c5d22e 5a1f323ef56d | 8 |
| 697 | 14:41:29.431515 | 192.168.9.100 | 184.16.123.96 | | 8 |
| 699 | 14:41:29.434674 | 192.168.9.100 | 184.16.123.96 | | 8 |
| 713 | 14:41:29.452419 | 192.168.9.100 | 184.16.123.96 | | 8 |
| 717 | 14:41:29.480383 | 192.168.9.100 | 184.16.123.96 | | 8 |
| 718 | 14:41:29.480563 | 192.168.9.100 | 184.16.123.96 | | 8 |

1700B

| St | Header Form | Packet Length | Info |
| --- | --- | --- | --- |
| 8 | Long Header | 1250 | Initial, DCID=45a52fe1e9a4118d, PKN: 1, CRYPTO, CRYPTO, PING, CRYPTO, PI |
| 8 | Long Header | 1250 | Initial, DCID=01e3ac1ac7f0929014e3381ae6f0989a270c0001, PKN: 2, ACK, PAD |
| 8 | Long Header | 52 | Handshake, DCID=01e3ac1ac7f0929014e3381ae6f0989a270c0001 |
| 8 | Long Header | 51 | Handshake, DCID=01e3ac1ac7f0929014e3381ae6f0989a270c0001 |
| 8 | Long Header | 91 | Handshake, DCID=01e3ac1ac7f0929014e3381ae6f0989a270c0001 |
| 8 | Short Header | 84 | Protected Payload (KP0), DCID=01e3ac1ac7f0929014e3381ae6f0989a270c0001 |

FIG. 17

DETERMINING SUM LENGTH OF HOST AND PATH IN ENCRYPTED HTTP REQUEST MESSAGE

BACKGROUND

The Hypertext Transfer Protocol (HTTP) is an application layer protocol in the Internet protocol suite. The encrypted HTTP (or HTTP Secure, HTTPS) brought the encryption of the HTTP request message using the Transport Layer Security (TLS) cryptographic protocol. Up to version TLS 1.2, all request details except the Server Name Indication (SNI) became unavailable for network-level cybersecurity solutions. With the Encrypted Client Hello (ECH) protocol extension to the TLS 1.3, the requested SNI became encrypted too.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which:

FIG. 1A and FIG. 1B are flowcharts illustrating examples of a method;

FIG. 8 illustrates an experiment related to a length of a host and a path in an encrypted HTTP message;

FIG. 9A, FIG. 9B, and FIG. 9C illustrate various example structures of HTTP/1 request messages;

FIG. 15 illustrates an example use of the sum length of the host and path;

FIG. 16 illustrates an example of HTTP/2 header compression; and

FIG. 17 illustrates an example JA4_b field of a JA4 fingerprint.

DETAILED DESCRIPTION

Figure 1A:
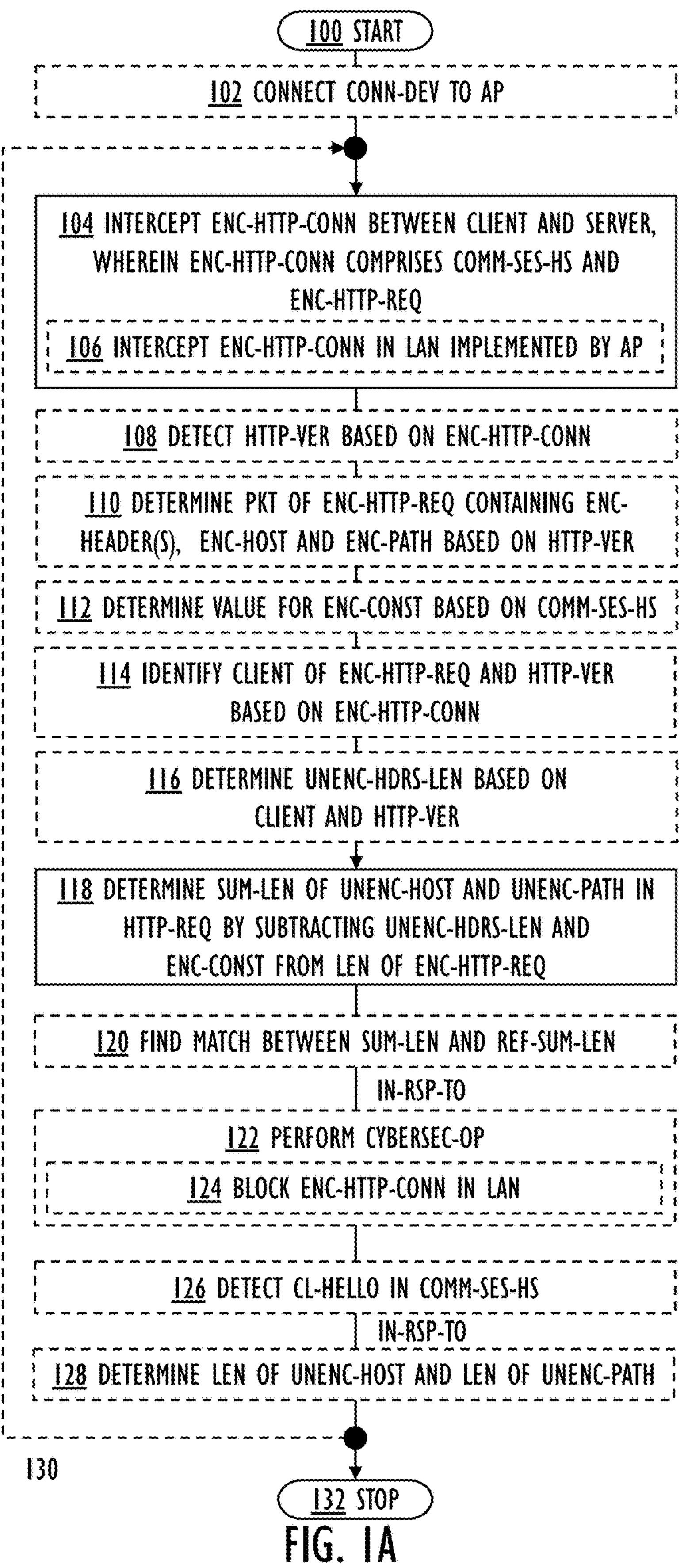

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Connected devices use websites for various operations, such as browsing webpages of a visited website, uploading sensor data to a target website, or downloading a software update from a source website. An HTTP request message defines the website as a host, and also a path within the host. A uniform resource locator (URL), also known as an address on the World Wide Web (WWW), is a reference to a resource. A URL is used to refer to a web page (of a target website). A web browser displays the URL of the web page in an address bar with the format:

protocol://host/some/path/
file.ext?query_param1=val1&query_param2=val2#fragment.

If all elements after the path are present, a HTTP request may look like: GET/some/path/ file.ext?query_param1=val1&query_param2=val2#fragment.

The path within the host contains all the URL elements after the GET:/some/path/ file.ext?query_param1=val1&query_param2=val2#fragment.

As used herein, the term "host" refers to the actual host element of the URL, which may be defined as a fully qualified domain name (FQDN).

As used herein, the term "path" refers to the actual path element of the URL, but also to the optional query and fragment elements shown above.

A network-level cybersecurity solution relies on checking a reputation of the accessed website. As at least the path in the HTTP request message is encrypted (in TLS 1.2), but possibly also the host in the HTTP request message is encrypted (in TLS 1.3), the accessed website, or at least the path in the accessed website remains unidentifiable, whereby a reputation check of the accessed website is incomplete or impossible. The encryption of the SNI is done by the (optional) ECH extension of the TLS 1.3. When a modern TLS client connects to the server, it always uses TLS 1.2 (since it does not know which version the server supports). The TLS client may also inform that it supports the TLS 1.3, so the server may switch to using the TLS 1.3 instead of the TLS 1.2. The TLS 1.2 uses more back and forth packets than the TLS 1.3 for a TLS session handshake.

If TLS 1.2 or TLS 1.3 (without ECH) is used to encrypt HTTP (HTTPS), a network-level cybersecurity solution is not able to distinguish between the following URLs on the same website drive.google.com (including the definition of the host and the path):

https://drive.google.com/ https://drive.google.com/bad_guy/malware.exe https://drive.google.com/good_guy/document.doc In other words, a reputation check of the host "drive-.google.com" is not meaningful, if the exact path ("/", "/bad_guy/malware.exe", or "/good_guy/document.doc") is not known.

If TLS 1.3 with the ECH extension is used for the encrypted HTTP, the network-level cybersecurity solution is able to define for an IP address only a list of possibly visited websites by consulting previously collected reverse mapping of hosts to IP addresses:

site1.com some-site2.com other-site.eu

In other words, a reputation check of the hosts ("site1.com", "some-site2.com", and "other-site.eu") hosted in a specific IP address is not meaningful as the collection of the hosts may contain both malicious and trusted websites.

FIG. 8 illustrates an experiment by the applicant related to a length of a host and a path in an encrypted HTTP message.

First, a target website was visited for the host "test1.cujo-labs.eu" five different times 800 with paths "/", "/aaa", "/aaaaaa", "/aaaaaaaaa", and "/aaaaaaaaaaaa". The caused network traffic 802 was captured by a network analyzer. The sizes (or lengths) of captured TLS frames are marked with rectangles 804 for the five different times 800 with different paths. The TLS frame sizes grew as follows:

for the path "/", the size is 166, for the path "/aaa", the size is 169, for the path "/aaaaaa", the size is 172, for the path "/aaaaaaaaa", the size is 175, and for the path "/aaaaaaaaaaaa", the size is 178.

Next, a target website was visited for different hosts "aaa.cujo-labs.eu", "aaaaaa.cujo-labs.eu", "aaaaaaaaa.cujo-labs.eu", and "aaaaaaaaaaaa.cujo-labs.eu" four different times 806 with the same path "/". The caused network traffic 808 was captured by a network analyzer. The sizes of the captured TLS frames are marked with rectangles 810 for the four different times 806 with the same path. The TLS frame sizes grew as follows:

for the host "aaa.cujo-labs.eu", the size is 164, for the host "aaaaaa.cujo-labs.eu", the size is 167, for the path "aaaaaaaaa.cujo-labs.eu", the size is 170, and for the path "aaaaaaaaaaaa.cujo-labs.eu", the size is 173.

The experiments show that when the length of either the path or the host is increased by three, the size of the TLS frame is also increased by three.

Figure 3:
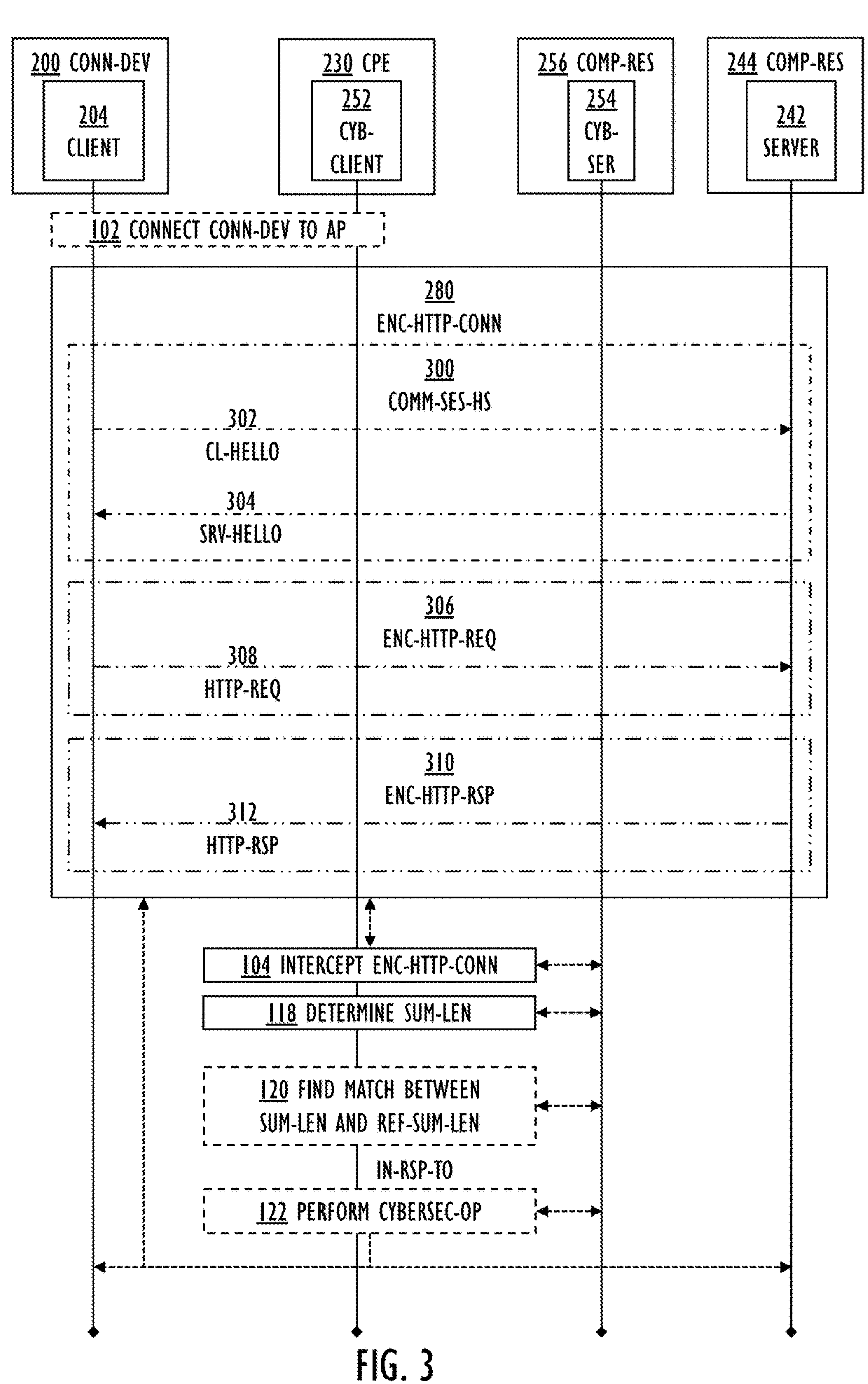
FIG. 3 is a sequence chart illustrating example communication between various actors of the method.

The Hypertext Transfer Protocol (HTTP) is an application layer protocol in the Internet protocol suite. HTTP functions as a request and response protocol in the client and server model. The client may be implemented as a web browser executing on the connected device, for example. The server may be implemented as a web server process executing on a computing resource hosting the website. The client submits an HTTP request message 306 to the server. The server returns a HTTP response message 310 to the client. As shown in FIG. 3, the encrypted HTTP request message 306 may contain or more HTTP requests 308, and the HTTP response message 310 may contain one or more HTTP responses 312.

The filtering of the fully qualified domain names (FQDN) that clients try to access may be achieved in two ways: with packet inspection using a server name indication (SNI) from the transport layer security (TLS) protocol or a host header from the hypertext transfer protocol (HTTP), or with DNS filtering using FQDNs from client domain name system (DNS) requests. "Filtering" refers to applying classification (security or content category) checks on the FQDN and making an allow or block decision regarding an access to the target website.

Privacy-oriented extension of existing protocols (such as the encrypted client hello (ECH) in TLS1.3) as well as new secure encrypted DNS protocols (the DNS over hypertext transfer protocol secure (DoH) protocol, the DNS over transport layer security (DoT) protocol, and the DNS over QUIC (DoQ) protocol) impact existing network security solutions by hiding the object of the security check and thus making them inefficient. The introduction of the ECH makes the TLS SNI unusable for security checks.

FIG. 1A and FIG. 1B are flowcharts illustrating examples of a method. The method performs operations related to network behavior in order to detect an imposter connected device.

The method starts in 100 and ends in 132. The method may run in principle endlessly. The infinite running may be achieved by looping 130 back.

The operations are not strictly in chronological order, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

Figure 2:
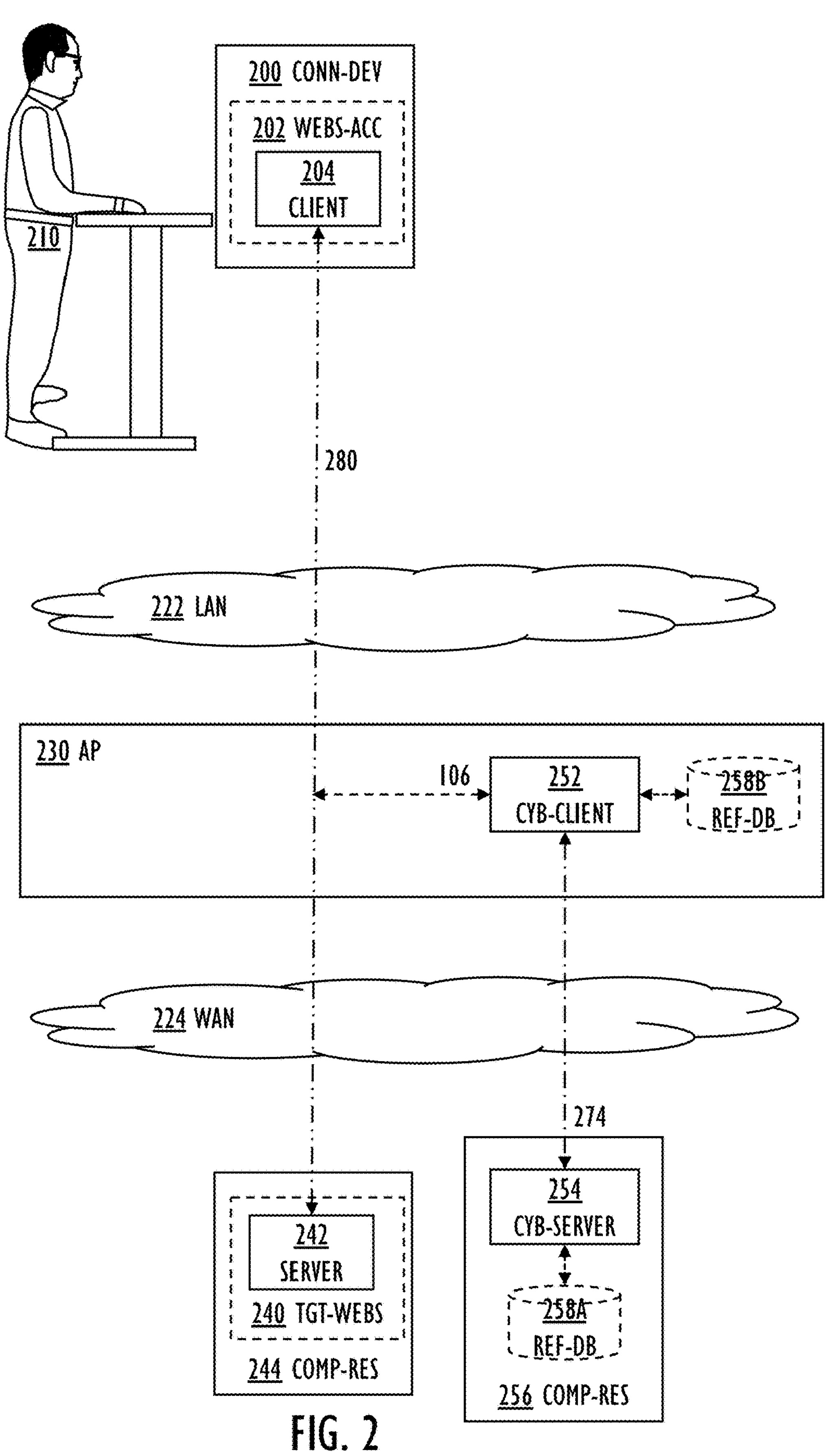
FIG. 2 is a block diagram illustrating an example implementation environment for the method.

FIG. 2 is a block diagram illustrating an example implementation environment for the method. The method may be a computer-implemented method. The method may operate within an access point 230, but optionally also partly within a computing resource 256.

FIG. 3 is a sequence chart illustrating example communication between various actors of the method.

As used herein, the term "connected device" 200 refers to a physical device with communication capabilities.

As used herein, the term "access point" 230 refers to a physical device providing a local area network 222 for the connected device 200, and an access for the connected device 200 to a wide area network (WAN) 224 such as the Internet.

As used herein, the term "connection" 280 refers to a (wired or wireless) network connection between the connected device 200 and the access point 230. The connection 280 is first established 102 between the connected device and the access point 230. Next, the connection 280 may be used to transfer data communication between the connected device 200 and a target website 240 using the HTTPS connection. The establishment of the HTTPS connection may require that the connection is first used to transfer data communication with a domain name system (DNS) server (not illustrated in FIG. 2).

The connection between the connected device 200 and the access point 230 may comprise a wireless connection between the connected device 200 and the access point 230.

In an example, the local area network 222 may be implemented by a customer-premises equipment (CPE) as the access point 230. The CPE 230 may implement the local area network (LAN) 222 between the connected device 200 and the CPE 230. The LAN 222 may be a wireless network, which enables the wireless connection between the CPE 230 and the connected device 200. The CPE 230 provides the access to the WAN 224. In the wireless connection, data packets may be transferred from and to the connected device 200. Additionally, or alternatively, the LAN 222 may be a wired network, such as Ethernet. In an example, the CPE 230 is configured to generate a wireless non-cellular internet access network 222. The CPE 230 may be configured to operate at a home or an office of a user 210 of the connected device 200.

The access point 230 may also be configured to operate out of the home or the office of the user 210 as a hotspot serving the connected devices 200 in a public place such as a cafe, city center, shopping mall, airport, an arena, etc.

An encrypted HTTP (or HTTPS) connection 280 between a client 202 and a server 240 is intercepted 104. The encrypted HTTP connection 280 comprises a communication session handshake 300, and an encrypted HTTP request message 306. In an example, the communication session handshake comprises a transport layer security (TLS) session handshake.

Intercepting 104 the encrypted HTTP connection 280 between the client 202 and the server 240 may be implemented so that the encrypted HTTP connection 280 is intercepted 106 in the local area network (LAN) 222 implemented by the access point 230. The access point 230 may be implemented as the customer-premises equipment (CPE). The client 204 may be configured to execute in the connected device 200. The server 242 may be configured to execute in a computing resource 244 to implement the target website 240.

The connected device 200 may be configured to execute a website access application 202, such as web user interface application (a web browser, for example), or a stand-alone application (a mobile app, for example), and as a result, data communication containing the encrypted HTTP connection 280 is conveyed from the connected device 200 to the accessed website 240 via the LAN 222 and the WAN 224. The website access application 202 may automatically cause the data communication, or, alternatively, the data communication may be generated as a result of an action by the user 210 through user interface controls of the website access application 202.

The website access application 202 running in the connected device 200 may act as the client 202 seeking to establish the encrypted HTTP connection 280 to the target website 240 acting as the server 240 hosted by the computing resource 244, for example.

A sum length of an unencrypted host and an unencrypted path in the encrypted HTTP request message is determined 118 by subtracting an unencrypted headers length and an encryption constant from a length of the encrypted HTTP request message.

Figures 10, 11, 12:
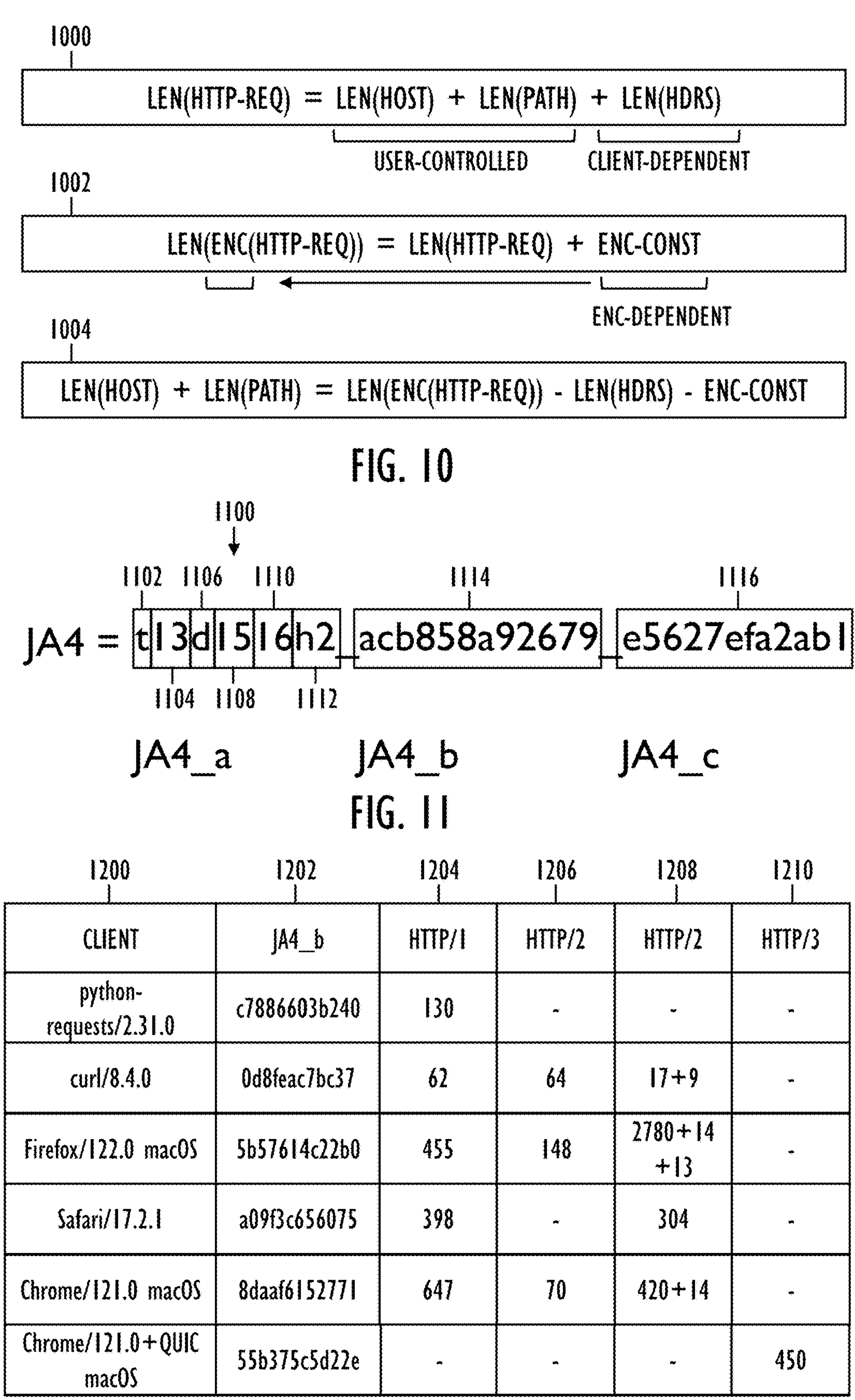
FIG. 10 illustrates example calculations related to the length of the host and path.
FIG. 11 illustrates an example JA4 fingerprint.
FIG. 12 illustrates an example of different clients, their JA4_b fields, and header lengths for various versions of the HTTP.

FIG. 10 illustrates example calculations related to the length of the host and path.

The first equation 1000 defines that the length of an unencrypted HTTP request message is a sum of a length of an unencrypted host, a length of an unencrypted path, and a length of unencrypted headers. The lengths of the host and path are user-controlled, whereas the length of the unencrypted headers are client-dependent.

The second equation 1002 defines that the length of an encrypted HTTP request message is a sum of the length of the unencrypted HTTP request message and an encryption constant. The encryption constant depends on the used encryption method.

In an example, a value for the encryption constant is determined 112 based on the communication session handshake.

In an example, the encryption constant may be determined with a testing of a condition clause 136: in response to determining that the TLS session handshake of the communication session handshake comprises a ClientKeyExchange record with a size of 70, a ChangeCipherSpec record with a size of 1, and an EncryptedHandshake record with a size of 40, then the value 24 is set 136 into the encryption constant, or else the value 17 is set 138 into the encryption constant.

The third equation 1004 is obtained by placing the first equation 1000 (defining the length of the unencrypted HTTP request message) in the second equation 1002, and solving the lengths of the unencrypted host and the unencrypted path. This results in a sum length of an unencrypted host and an unencrypted path in the encrypted HTTP request message is equal to the length of the encrypted HTTP request message subtracted by the unencrypted headers length and the encryption constant.

In an example, a client (or user agent) of the encrypted HTTP request message and a version of HTTP is identified 114 based on the encrypted HTTP connection (such as based on the communication session handshake, and optionally also based on the encrypted HTTP request message). The unencrypted headers length may be determined 116 based on the client and the version of the HTTP.

FIG. 9A, FIG. 9B and FIG. 9C illustrate various example structures of HTTP/1 request messages 900, 902, 904, 906 for different clients (or user agents): Python®, Safari®, Chrome®, Firefox®. Each of these different example HTTP request messages contain default headers, whereby the unencrypted headers lengths may be defined for each client.

A Python request 900 may contain a method, such as GET in our example. Other options for the method comprise HEAD, POST, PUT, PATCH, DELETE, etc. Unless the Python request is implemented using a Python requests application programming interface (API), the first request to a target website is always GET.

An example path in the Python request 900 is "/aaa". The default path is usually "/", unless the target website is visited in response to a link (from an email message, or from another visited website, for example).

An example host in the Python request 900 is "aaa.cujo-labs.eu", indicating a name of the target website. Each target website may be specified by a the FQDN.

An example user agent in the Python request 900 is "python-requests/2.31.0", indicating the client and staying the same at least for the same version on the same platform, unless overridden by a developer.

The rest of the Python request 900 contains default headers, staying the same unless overridden by the developer.

A Safari request 902 contains more default headers. The safari request 902 contains a detailed user agent, and also includes the preferred language "en-US,en", which may be different (en-GB,en, fi-FI,en, etc.) depending on browser settings, but is rarely changed in practice.

A Chrome request 904 contains even more default headers. The Chrome request 904 contains a detailed user agent, and also includes an experimental client hint.

A Firefox request 906 contains a slightly different set of default headers. Two headers, DNT: 1 and Sec-GPC: 1, are user-configurable, but their values are either 0 or 1, so they do not impact the total length of the default headers.

In an example, identifying 114 the client of the encrypted HTTP request message based on the encrypted HTTP connection is implemented so that the client is identified 142 based on a fingerprint generated 140 with a John Althouse 4 (JA4) algorithm for a client hello message 302 of the communication session handshake 300. The client hello 302 message may be a part of the TLS session handshake of the communication session handshake. The server 242 responds with a server hello message 304.

FIG. 11 illustrates an example JA4 ClientHello fingerprint. The JA4 fingerprint may comprise three fields: JA4_a 1100, JA4_b 1114, and JA4_c 1116.

In an example, the client is identified 142 based on the JA4_b field 1114. The JA4_b field may be a truncated Secure Hash Algorithm 256 (SHA256) hash of the cipher suites, sorted.

Optionally, the identification 142 of the client is also based on at least a part of the JA4_afield 1110.

The JA4_afield 1110 may contain the following information:

- 1102 indicates the protocol: "t" is for Transmission Control Protocol (TCP) and "q" for QUIC protocol;
- 1104 indicates the TLS version: "12" is for the version 1.2, and "13" is for the version 1.3;
- 1106 indicates the existence of the SNI: "d" is for "to domain", and "i" indicates "to IP" (meaning that there is no SNI defined);
- 1108 indicates the number of cipher suites;
- 1110 indicates the number of extensions; and
- 1112 indicates a first Application-Layer Protocol Negotiation (ALPN) value ("00" indicates no ALPN).

The JA4_c field may be a SHA256 hash of the extensions, sorted, and signature algorithms in the order they appear. In practice, the JA4_c field 1116 may often be garbage.

FIG. 12 illustrates an example of different clients, their JA4_b fields, and header lengths for various versions of the HTTP. The clients 1200 in our example are Python, Client for URL (cURL), Firefox, Safari, and Chrome (two versions, the other with QUIC). Each client 1200 has a different JA4_b signature 1202. Column 1204 shows the lengths of the HTTP/1 default headers for each client 1200. Column 1206 shows the lengths of the so-called magic HTTP/2 headers for each client 1200. Column 1208 shows the lengths of the HTTP/2 default headers for each client 1200. Column 1210 shows lengths of the HTTP/3 default headers for each client 1200. Note that hyphens ('-') in the columns 1204, 1206, 1208, 1210 show combinations that have not been experimented by the applicant.

In an example, a version of the HTTP is detected 108 based on the encrypted HTTP connection (such as based on the communication session handshake, and optionally also based on the encrypted HTTP request message), and a packet of the encrypted HTTP request message containing one or more encrypted headers, an encrypted host, and an encrypted path is determined 110 based on the version of the HTTP.

Figure 13A:
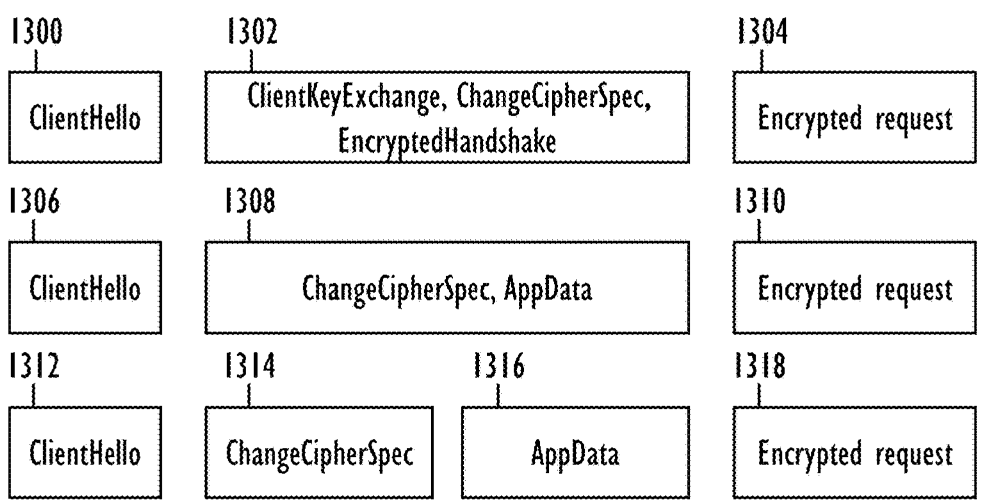
FIG. 13A, FIG. 13B, and FIG. 13C illustrate example packet structures of the HTTP request message.

FIG. 13A illustrates example packet structures of the HTTP/1 request messages. In a first example, a ClientHello packet 1300 and a packet 1302 containing a ClientKeyExchange, ChangeCipherSpec, and EncryptedHandshake records are transmitted before a packet 1304 containing the encrypted HTTP request message. In a second example, a ClientHello packet 1306 and a packet 1308 containing a ChangeCipherSpec and AppData records are transmitted before a packet 1310 containing the encrypted HTTP request message. In a third example, a ClientHello packet 1312, a packet 1314 containing a ChangeCipherSpec record, and a packet 1316 containing AppData record are transmitted before a packet 1318 containing the encrypted HTTP request message.

Figure 13B:
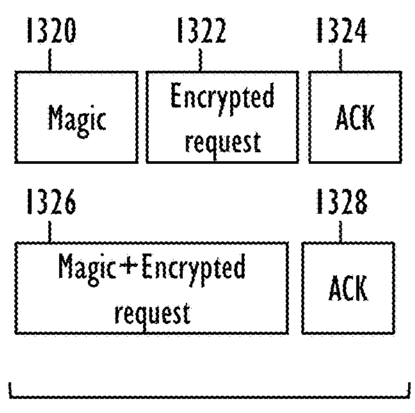

FIG. 13B illustrates example packet structures of the HTTP/2 request messages. The beginning packet sequences may be as in FIG. 13A: 1300-1302, 1306-1308, and 1312-1314-1314, but any of these three examples contain the packet of the encrypted HTTP request with one of the two examples:

- a magic packet 1322 followed by a packet 1322 containing the encrypted HTTP request, and by an acknowledgement packet 1324 with a length of 26; or
- a packet 1326 (of Safari) combining a magic packet and a packet containing the encrypted HTTP request followed by an acknowledgement packet 1328 with a length of 26.

All these packets 1320, 1322, 1324, 1326, 1328 are visible on the network as encrypted TLS AppData packets.

Figure 13C:
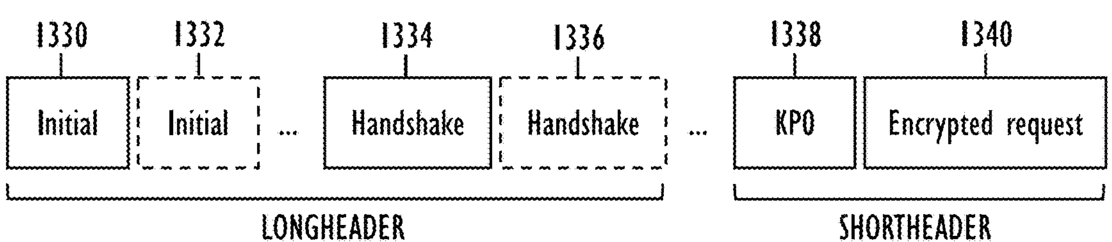

FIG. 13C illustrates example packet structures of the HTTP/3 request messages. Experiments shows that Chrome stores the encrypted HTTP request message in a second QUIC packet 1340 of a ShortHeader (after a KPO packet 1338 of the ShortHeader), preceded by one or more initial packets 1330, 1332 and one or more handshake packets 1334, 1336 of a LongHeader. FIG. 17 illustrates an example JA4_b field 1702 of a JA4 fingerprint in the intercepted network analyzer data 1700A, 1700B for the encrypted HTTP request message in Chrome using the QUIC protocol.

In an example, in response to finding 120 a match between the sum length of the unencrypted host and the unencrypted path and a reference sum length in a reference database 258A, 258B containing known malicious hosts and paths and their sum lengths, a cybersecurity operation is performed 122 in relation to one or more of the client 204, the server 242, and the encrypted HTTP connection 280. The cybersecurity operation may comprise blocking 124 the encrypted HTTP connection 280 in the LAN 222.

The reference database 258A, 258B may be distributed between the access point 230 and the computing resource 256, or the reference database may be located in either the access point 230 or in the computing resource 256.

The reference database 258A, 258B may comprise sum lengths of hosts and paths of malicious websites. This may be applied to the HTTP/1.

The sum lengths of hosts and paths of malicious websites may comprise sum lengths of compressed hosts and paths of malicious websites. This may be applied to the HTTP/2 and HTTP/3 because they use header compression techniques (HPACK for HTTP/2 and QPACK for HTTP/3).

HPACK compresses the headers of HTTP/2 requests and responses. HPACK encodes the headers using a combination of Huffman coding and dictionary-based compression (with a static dictionary of frequently used header fields and values, but HPACK may also create a dynamic dictionary for each connection). Using HPACK to compress headers in this manner will be referred to throughout as "hpacking," and any elements that have been compressed using HPACK will be referred to as "hpacked".

FIG. 16 illustrates an example of HTTP/2 header compression. Advantageously, HPACK compresses headers one-by-one, using shared dictionary and Huffman coding, unlike stream compressors like zip.

An equation 1600 defines that the sum length of an unencrypted hpacked host and an unencrypted hpacked path in the encrypted HTTP request message is equal to the length of the encrypted hpacked HTTP request message subtracted by the unencrypted hpacked headers length and the encryption constant.

This enables an estimation of sizes of the uncompressed values: the length of the unencrypted path with a hpacked size 14 is between 13 and 16, for example. The calculation becomes easier when there is a list of possible SNIs (for the ECH use case), or known non-ECH URLs. The known hosts and paths of malicious websites may be hpacked for the reference database 258A, 258B.

QPACK used in the HTTP/3 is similar to HPACK in that it also uses a combination of Huffman coding and dictionary-based compression. There are some differences, such as that QPACK uses a single, shared dictionary for all connections, whereas HPACK uses a separate dictionary for each connection, but these may be taken into account.

In an example, a client hello message 302 (either at least partly unencrypted, or encrypted) may be detected 126, and the length of the unencrypted host and the length of the unencrypted path may be determined 128 (separately for each and not only as the sum length).

In response to detecting 126 an at least partly unencrypted client hello message 302 in the communication session handshake 300, a length of the unencrypted host may be determined 128 as a length of a server name indication (SNI) extension in the at least partly unencrypted client hello message, and a length of the unencrypted path may be determined 128 by subtracting the length of the SNI extension in the at least partly unencrypted client hello message from the sum length of the unencrypted host and the unencrypted path in the encrypted HTTP request message.

In response to detecting 126 an encrypted client hello (ECH) message 302 in the communication session handshake 300, a length of an encrypted host may be determined 128 as a length of an inner server name indication (SNI) in the ECH message, a path may be determined 128 as a slash, and a length of the unencrypted path may be determined 128 as one.

Figure 14:
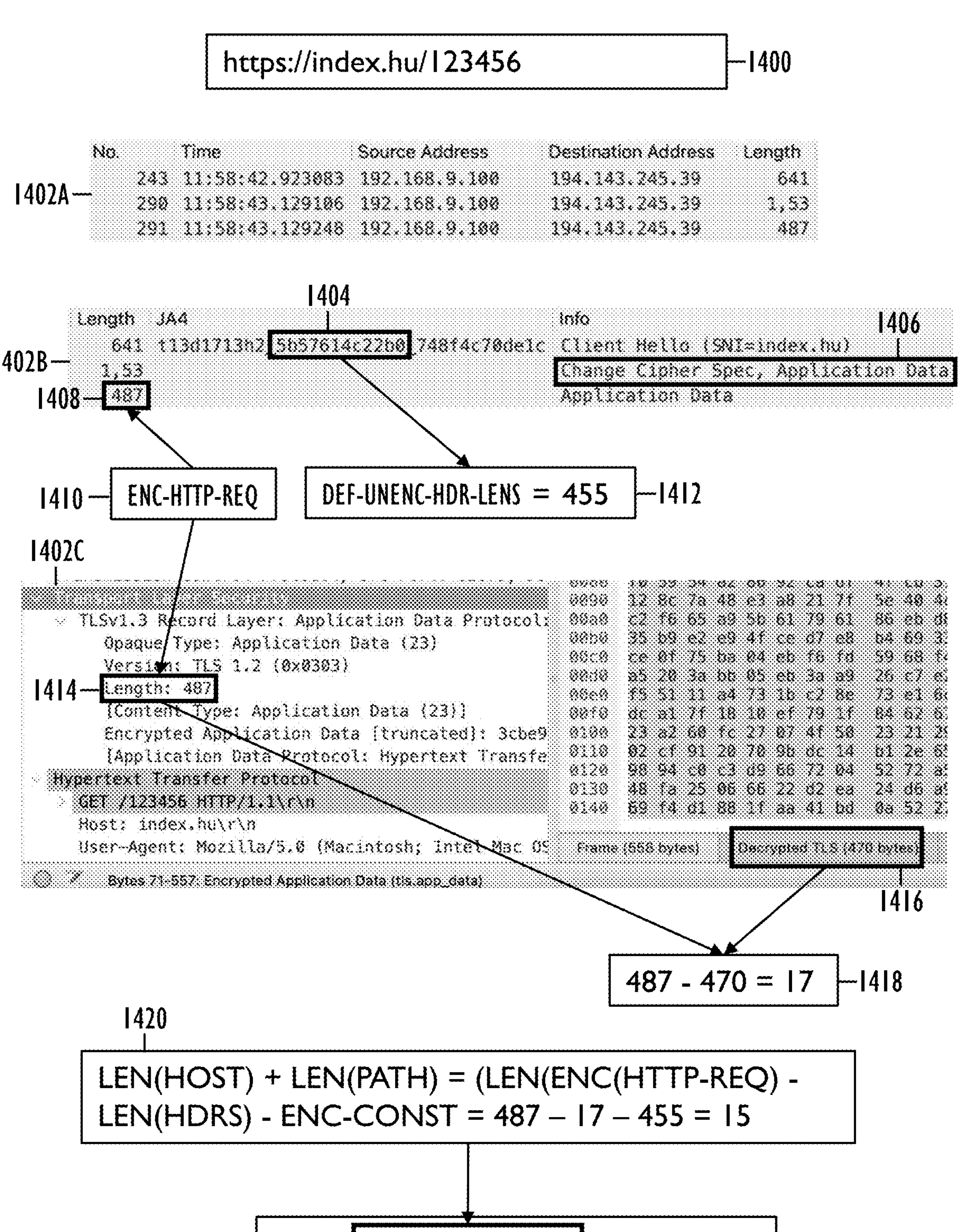
FIG. 14 illustrates an example of calculating the sum length of the host and path.

FIG. 14 illustrates an example of calculating the sum length of the host and path.

The user 210 of the client 204 inputs the uniform resource locator (URL) 1400 for the website access application 204: https://index.hu/123456.

The network analyzer intercepts the encrypted HTTP connection 280, and the captured data 1402A, 1402B, 1402C shows the JA4 fingerprint, whose JA4_b field 1404 has the value "5b57614c22b0", which matches the client 1200 Firefox/122.0 macOS in FIG. 12, and the default header size for the HTTP/1 is 455 as shown in 1412.

The packet structure is shown in FIG. 13A: the packet 1406 containing a ClientKeyExchange, ChangeCipherSpec, and EncryptedHandshake records are transmitted before the packet 1408 containing the encrypted HTTP request message. As shown in 1408 and 1414, the length of the encrypted HTTP request message 1410 is 487.

The captured data 1402C also shows the length of the decrypted HTTP request message in 1416 as 470.

The encryption constant may be calculated 1418 by subtracting the length of the decrypted HTTP request message from the length of the encrypted HTTP request message: 487−470=17.

The sum length of the unencrypted host and the unencrypted path in the encrypted HTTP request message is then determined 118, 1420 by subtracting the unencrypted headers length and the encryption constant from the length of the encrypted HTTP request message: 487−17−455=15.

This may be checked by calculating the host and path from the URL 1400: the length of the "index.hu/123456" 1422 is 15.

FIG. 15 illustrates an example use of the sum length of the host and path.

In the non-ECH example of FIG. 14, the length of the path may be obtained 1500, 1502 using the SNI from the ClientHello: a length of the path is equal to the length of the host and path subtracted by the length of the SNI from the ClientHello=15−len ("index.hu")=15−8=7, which is the length of the path "/123456".

In an ECH use case example, the inner SNI length may be obtained 1504, which implies that the path is "/": a length of the inner SNI is equal to the length of the length of the host and path subtracted by the length of the path "/"=length of the host and path subtracted by one. Then from list of known hosts for the ECH public name the lengths of the host which differ from the determined may be eliminated. In this way, the list of the possible hosts becomes shorter.

The connected devices 200 (such as user devices or IoT devices) use websites for various operations. The user 210 of the (user) connected device 200 may use a browser to browse webpages of a website 240, to view media content provided on the webpages, for example. The (IoT) connected device 200 may upload sensor data gathered by one or more sensors onboard the connected device 200 to the website 240, for example. The connected device 200 may download a software update from the website 240, for example. Numerous other well-known operations related to the websites 240 may also be performed by the connected device 200.

The connected device 200 may create the connection using a packet protocol for the website access application 202 of the connected device 200 to the target website 240. The target website 240 may host a server application enabling access by the website access application 202. The packet protocols include, but are not limited to, Transmission Control Protocol/Internet Protocol (TCP/IP), User Datagram Protocol/Internet Protocol (UDP/IP), and QUIC, which establishes a multiplexed transport on top of the UDP. Various HTTP/HTTPS requests may then be transferred in the connection (using TCP streams or UDP datagrams, for example). In the Internet Protocol suite, the connection is operated in a link layer, an internet layer, and a transport layer, and the requests transmitted in the connection are operated in an application layer.

As used herein, the term "intercepting" refers to user-approved lawful interception or monitoring of the connection with a purpose and goal of increasing cybersecurity related to the connected device 200 and its operating environment. As the signal of the connection (such as a radio signal of a wireless connection), for example, is intercepted, the data communication transferred over the connection is accessed and collected between the transmitting device and the receiving device. The data communication may be intercepted even if the digital data transmission units (such as messages) in the connection are addressed to the receiving device (such as the target website 240). The intercepting may be implemented so that the connection is passively monitored, i.e., the connection is not affected by the intercepting. Alternatively, if needed, the intercepting may include a seizing of the connection, i.e., the connection is actively influenced so that a connection and/or requests and/or responses are blocked until it may be decided whether a cybersecurity action (such as blocking of the connection) is required.

As used herein, the term "data communication" refers to the transmission and/or reception of (digital) data by the connected device 200. The data communication is transferred using digital data transmission units over a communication medium such as one or more communication channels in the connection (such as a wireless connection between the connected device 200 and another network node such as the target website 240. Besides over radio interface, the data communication may be conveyed over another transmission medium (implemented by copper wires, or optical fibers, for example). The data are a collection of discrete values that convey information, or sequences of symbols that may be interpreted, expressed as a digital bitstream or a digitized analog signal, including, but not being limited to: text, numbers, image, audio, video, and multimedia. The data may be represented as an electromagnetic signal (such as an electrical voltage or a radio wave, for example). The digital transmission units may be transmitted individually, or in a series over a period of time, or in parallel over two or more communication channels, and include, but are not limited to: messages, protocol units, packets, and frames. One or more communication protocols may define a set of rules followed by the connected device 200 and other network nodes to implement the successful and reliable data communication over the wireless connection. The communication protocols may implement a protocol stack with different conceptual protocol layers.

In order to establish the encrypted HTTP (or HTTPS) connection 280, there may first be a connection between the connected device 200 and the access point 230 to access a domain name system (DNS) server (not illustrated in FIG. 2) operating either at the access point 230 or accessible through the WAN 224.

In an example, each target website 240 is specified by the FQDN. The FQDN is a domain name, which specifies the exact location of the website 240 in the tree hierarchy of the DNS. For example, the FQDN of the target website may be patent.somehost.exampledomain.com., wherein the root zone is ".", the top-level domain is "com", a (second level) subdomain "exampledomain", a (third level) subdomain "somehost" and a (fourth level) subdomain "patent". In this example, the third level subdomain "somehost" may be called a hostname, and the combination of the top-level domain and the second level subdomain "exampledomain.com" may be called a domain. A cybersecurity reputation of the target website 240 may be tied to the FQDN of the target website 240. For example, the reputation may be maintained for the FQDN "somehost.exampledomain.com." including the hostname. Or, in a more general way, the cybersecurity reputation may be maintained for the FQDN "exampledomain.com.", specifying the domain, whereby it defines the reputations for all its subdomains, such as "patent.somehost.exampledomain.com.",
"trademark.somehost.exampledomain.com.",
"www.exampledomain.com.",
etc.

The DNS server (sometimes also known as a DNS proxy server, a DNS resolver, or a recursive resolver) is a server configured to receive DNS queries from web browsers and other applications. The DNS server receives the FQDN, and it is responsible for finding out the corresponding IP address. One FQDN may be mapped to many IP addresses, and, vice versa, one IP address may be mapped to many FQDNs.

The IP address identifies (a network interface of) the host, and a location of the host on the Internet, whereby each IP packet containing an IP address of a source host and an IP address of a destination host, may be routed by a network path from the source host (or the connected device 200) to the destination host (or the accessed target website 240). In this way, the IP address identifies the target website 240 (acting as the host).

In contrast to the FQDN being a text string, the IP address is a numerical label, defined as a 32-bit number (IPv4) or a 128-bit number (IPv6). A human-readable notation of the IPV4 address expresses the address as four consecutive decimal numbers (each representing 8 bits) separated by commas, the IPV4 address therefore ranging from 0.0.0.0 to 255.255.255.255. IPV6 has in the human-readable notation eight consecutive hexadecimal numbers (each hexadecimal number having four digits and representing 16 bits) separated by colons.

The IP address may be a static IP address, meaning that the address does not change, or a dynamic IP address, which is assigned to the host by the network when it connects, meaning that the address changes over time. The dynamic IP address of the connected device 200 may be assigned (and reassigned) by a DHCP server (not illustrated in FIG. 2), usually for a DHCP lease time (such as 24 hours, a fortnight, etc.).

The (cybersecurity) reputation of the target website 240 may be defined with four categories, for example: malicious, trustworthy, suspicious, or unknown. If the reputation is malicious, an appropriate cybersecurity operation may be to block an access from the connected device 200 to the target website 240. But if the reputation is trustworthy, no cybersecurity operation is needed, and a network traffic from the connected device 200 to the target website 240 is allowed. The reputation may also be suspicious, which may necessitate an appropriate cybersecurity operation such as indicating the suspicious reputation of the website 240 to the user 210 of the connected device 200, and such as inquiring from the user 210 whether the access to the suspicious website should continue. If the reputation is unknown, the warning and user inquiry may be used, but in addition to this, the cybersecurity system triggers an analysis for determining the reputation for this previously unknown website. As shown in FIG. 2, a cybersecurity client 252 operating on the CPE 230, possibly aided by a cybersecurity server 254, may determine the reputation of the target website 240. The reputation may be retrieved from a cache (in the cybersecurity client 252) or a database (in the cybersecurity server 254), which may be updated continuously by a supervised machine learning algorithm using a training set comprising malicious websites and trustworthy websites, for example.

The radio signal of the wireless connection may be intercepted by a cybersecurity client 252 operating in the CPE 230. The data communication going through the connection may be accessed and collected by the cybersecurity client 252. The cybersecurity client 252 may also access a data structure related to the connection established and maintained at the CPE 230 after a successful handshake sequence between the connected device 200 and the CPE 230. The intercepted radio signal may be analyzed in order to perform an appropriate cybersecurity operation by the cybersecurity client 252, possibly augmented by a cybersecurity server 254 operating in a networked computing resource 256. Machine learning algorithms may use a number of other data items (such as device-specific unique radio interface characteristics, and other active and historic unique identifiers related to the connected apparatus and its communication) besides the radio frequency fingerprinting to enable the device identification.

The WAN such as the Internet 224 uses the Internet Protocol suite including TCP/IP and UDP/IP to globally connect computer networks so that communication is enabled between connected devices 200 and various Internet services provided typically by websites 240. The Internet 224 comprises public networks, private networks, academic networks, business networks, government networks, etc. interlinked with various networking technologies. The various services provide access to vast World Wide Web (WWW) resources, wherein webpages may be written with Hypertext Markup Language (HTML) or Extensible Markup Language (XML) and accessed by a browser or another application (such as a mobile app) running in the connected device 200.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software, or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The attacked connected device 200 may be disguised as the imposter connected device 200 to perform malicious acts as a stand-alone device or in cooperation with fraud Internet services. Various configurations of the CPE 230 provided with a cybersecurity client 252, and the computing resource 256 provided with a cybersecurity server 254 are used to enforce cybersecurity. As shown in FIG. 2, the cybersecurity client 252 and the cybersecurity server 254 may be communicatively coupled 274 with each other. Note that different service providers, such as network service providers, cloud service operators, and cybersecurity operators, just to name a few, may operate and/or manage the various network elements related to the cybersecurity.

Figure 4A:
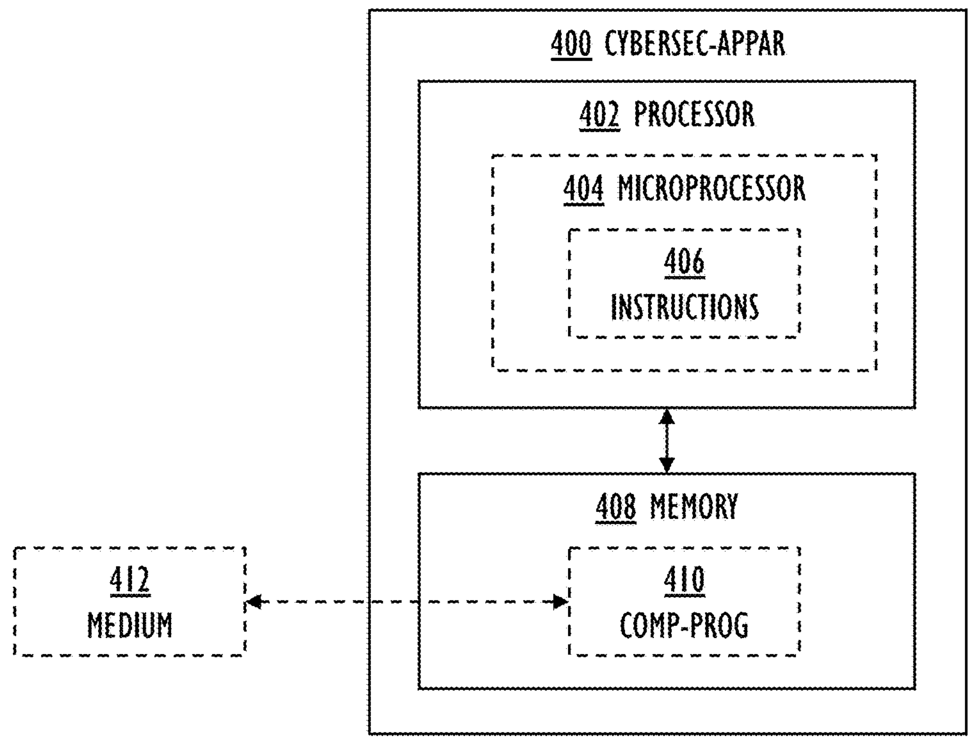
FIG. 4A and FIG. 4B are block diagrams illustrating examples of a cybersecurity apparatus.
Figure 4B:
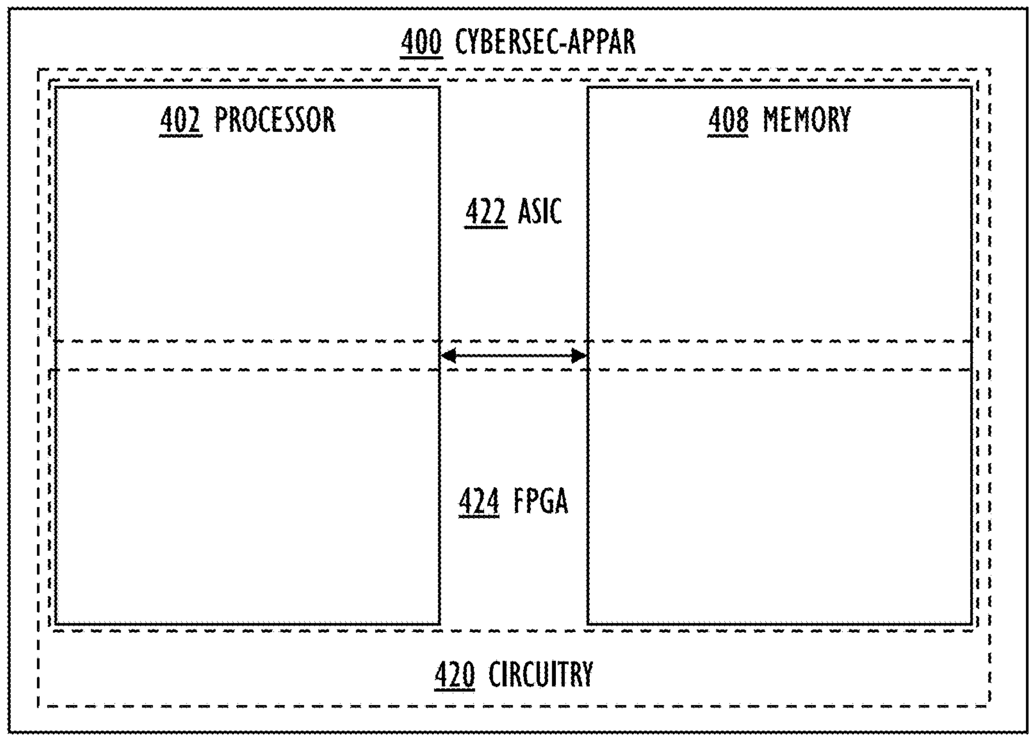

FIG. 4A and FIG. 4B are block diagrams illustrating examples of a cybersecurity apparatus 400. The method described with reference to FIG. 1A and FIG. 1B may be implemented by the cybersecurity apparatus 400. The apparatus 400 may execute the operations defined in the method. The apparatus 400 may implement an algorithm, which includes the operations of the method, but may optionally include other operations related to the cybersecurity in general. Note that the method described with reference to FIG. 1A and FIG. 1B may be implemented as a part of the cybersecurity client 252 running in the CPE 230 (or access point) as shown in FIG. 2. As shown in FIG. 2, the cybersecurity apparatus 400 may comprise various distributed actors 252, 254 communicatively coupled 274 with each other.

The cybersecurity apparatus 400 comprises one or more memories 408, and one or more processors 402 coupled to the one or more memories 408 configured to execute the operations described in FIG. 1A and FIG. 1B.

The term "processor" 402 refers to a device that is capable of processing data. The term "memory" 408 refers to a device that is capable of storing data run-time (=working memory) or permanently (=non-volatile memory).

As shown in FIG. 4A, the one or more processors 402 may be implemented as one or more microprocessors 404, which are configured to execute instructions 406 of a computer program 410 stored on the one or memories 408. The microprocessor 404 implements functions of a central processing unit (CPU) on an integrated circuit. The CPU is a logic machine executing the instructions 406 of the computer program 410. The CPU may comprise a set of registers, an arithmetic logic unit (ALU), and a control unit (CU). The control unit is controlled by a sequence of the instructions 406 transferred to the CPU from the (working) memory 408. The control unit may contain a number of microinstructions for basic operations. The implementation of the microinstructions may vary, depending on the CPU design. The one or more microprocessors 404 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 410 may be written ("coded") by a suitable programming language, and the resulting executable code may be stored in the memory 408 and executed by the one or more microprocessors 404.

The computer program 410 implements the method/algorithm. The computer program 410 may be coded using a programming language, which may be a high-level programming language, such as Go, Java, C, or C++, or with a low-level programming language, such as an assembler or a machine language. The computer program 410 may be in source code form, object code form, executable file, or in some intermediate form, but for use in the one or more microprocessors 404 it is in an executable form as an application. There are many ways to structure the computer program 410: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 410 for performing a wide variety of standard operations. In addition, an operating system (such as a general-purpose operating system) may provide the computer program 410 with system services.

As shown in FIG. 4A, a computer-readable medium 412 may store the computer program 410, which, when executed by the apparatus 400 (the computer program 410 may first be loaded into the one or more microprocessors 404 as the instructions 406 and then executed by one or more microprocessors 404), causes the apparatus 400 (or the one or more microprocessors 404) to carry out the method/algorithm. The computer-readable medium 412 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 410 to the one or memories 408 of the apparatus 400. In some jurisdictions, depending on the legislation and the patent practice, the computer-readable medium 412 may not be the wired or wireless telecommunications signal. The computer program 410 may be implemented as a computer program product comprising instructions which, when executed by the apparatus 400, cause the apparatus 400 to carry out the method.

As shown in FIG. 4B, the one or more processors 402 and the one or more memories 408 may be implemented by a circuitry 420. A non-exhaustive list of implementation techniques for the circuitry 420 includes, but is not limited to application-specific integrated circuits (ASIC) 422, field-programmable gate arrays (FPGA) 424, application-specific standard products (ASSP), standard integrated circuits, logic components, and other electronics structures employing custom-made or standard electronic circuits.

Note that in modern computing environments a hybrid implementation employing both the microprocessor technology of FIG. 4A and the custom or standard circuitry of FIG. 4B is feasible.

Functionality of the apparatus 400, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figures 5, 6, 7A, 7B:
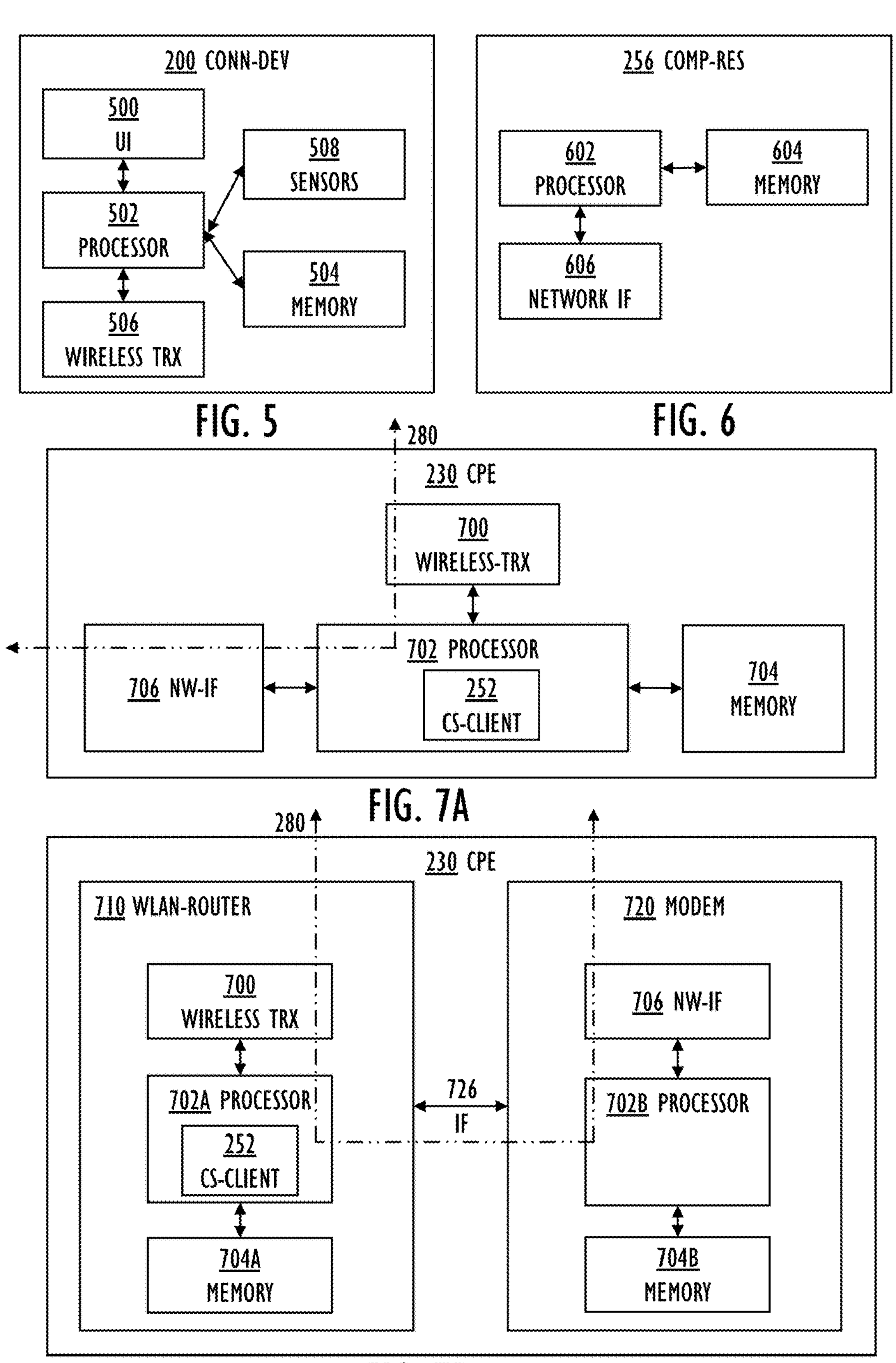
FIG. 5 is a block diagram illustrating an example of a connected device.
FIG. 6 is a block diagram illustrating an example of a computing resource.
FIG. 7A and FIG. 7B are block diagrams illustrating examples of a customer-premises equipment.

FIG. 5 is a block diagram illustrating an example of the connected device 200. The connected device 200 may be a terminal, a user equipment (UE), a radio terminal, a subscriber terminal, a smartphone, a mobile station, a mobile phone, a desktop computer, a portable computer, a laptop computer, a tablet computer, a smartwatch, smartglasses, another kind of ubiquitous computing device, or some other type of a wired or wireless mobile or stationary communication device operating with or without a subscriber identification module (SIM) or an embedded SIM (eSIM). The connected device 200 may be a personal communication device of the user 210. The connected device 200 may also be an Internet of Things (IoT) device, which is provided with processing and communication technology and may also include one or more sensors and a user interface, and may be a stand-alone device, or an embedded device in a lighting fixture, thermostat, home security system, camera, smart lock, smart doorbell, smart refrigerator, or another household appliance, heating and cooling system, home and building automation system, vehicle, health and fitness monitor, remote health monitoring system, environmental sensor, IP camera, or network attached storage (NAS), etc. In an example, the cybersecurity controls are more relaxed for the personal communication device of the user 210 than for the IoT device, whereby the attacker, while attacking a connected device 200 whose type is an IoT device, changes the type of the connected device 200 to a personal communication device. This is done by injecting network behavior of a specific (false) model of the personal communication device (instead of the network behavior of the true model of the IoT device).

The connected device 200 comprises one or more memories 504, and one or more processors 502 coupled to the one or more memories 504 configured to carry out a functionality of the connected device 200. In addition, the connected device 200 comprises a user interface 500 (such as a touch screen or one or more LEDs), and one or more wireless transceivers 506 (such as a WLAN transceiver, a cellular radio network transceiver, and a short-range radio transceiver), and also one or more sensors 508.

FIG. 6 is a block diagram illustrating an example of a computing resource 256 such as a server apparatus. The server apparatus 256 may be a networked computer server, which interoperates with the CPE 230 according to a client-server architecture, a cloud computing architecture, a peer-to-peer system, or another applicable distributed computing architecture. As shown in FIG. 6, the server apparatus 256 comprises one or more memories 604, and one or more processors 602 coupled to the one or more memories 604 configured to carry out the functionality of the cybersecurity server 254. In addition, the server apparatus 256 comprises a network interface (such as an Ethernet network interface card) 606 configured to couple the server apparatus 256 to the Internet 224.

FIG. 7A and FIG. 7B are block diagrams illustrating examples of the CPE 230. The access point 230 may comprise similar structures and functions.

The CPE 230 is located at home or office of the user 210 of the connected device 200. The CPE 230 is stationary equipment connected to a telecommunication circuit of a carrier (such as a network service provider (NSP) offering internet access using broadband or fixed wireless technologies) at a demarcation point. The demarcation point may be defined as a point at which the public Internet 224 ends and connects with the LAN 222 at the home or office. In this way, the CPE 230 acts as a network bridge, and/or a router.

The CPE 230 may include one or more functionalities of a router, a network switch, a residential gateway (RGW), a fixed mobile convergence product, a home networking adapter, an Internet access gateway, or another access product distributing the communication services locally in a residence or in an enterprise via a (typically wireless, but it may also additionally or alternatively be wired) LAN 222 and thus enabling the user 210 of the connected device 200 to access communication services of the NSP, and the Internet 224. Note that the CPE 230 may also be implemented with wireless technology, such as a 4G or 5G CPE 230 configured to exchange a 5G cellular radio network signal with the WAN 224 of a base station operated by the broadband service provider, and generate a Wi-Fi® (or WLAN) or wired signal to implement the LAN 222 to provide access for the connected device 200. Furthermore, the 4G/5G CPE 230 performs the conversion between the 4G/5G cellular radio network signal and the Wi-Fi® or wired signal.

In FIG. 7A, the CPE 230 is an integrated apparatus comprising one or more memories 704, and one or more processors 702 coupled to the one or more memories 704 configured to carry out a part of the method/algorithm in some examples. Additionally, the CPE 230 comprises a wireless radio transceiver 700 configured to create the LAN 222 for enabling access by the connected device 200. The CPE 230 also comprises a network interface 706 to act as a modem configured to connect to the telecommunication circuit of the carrier at the demarcation point, i.e., to the WAN 224. The network interface 706 may operate as a Digital Subscriber Line (DSL) modem using different variants such as Very high bitrate DSL (VDSL), Symmetric DSL (SDSL), or Asymmetric DSL (ADSL). The network interface 706 may also operate using alternative wired or even wireless access technologies including, but not being limited to: the Data Over Cable Service Interface Specification (DOCSIS), the Gigabit-capable Passive Optical Network (GPON), the Multimedia over Coax Alliance (MoCA®), the Multimedia Terminal Adapter (MTA), and the fourth generation (4G), fifth generation (5G), or even a higher generation cellular radio network access technology. The CPE 230 may be running the cybersecurity client 252.

In FIG. 7B, the CPE 230 is a two-part apparatus. A WLAN router part 710 comprises the one or more memories 704A, the one or more processors 702A coupled to the one or more memories 704A configured to carry out the method/algorithm, and the wireless transceiver 700 to create the LAN 222 for enabling access by the connected device 200. A modem part 720 comprises the one or more processors 702B coupled to one or more memories 704B configured to carry out modem operations, and the network interface 706 to act as the modem configured to connect to the WAN 224. The WLAN router part 710 may be purchased by the user 210 of the connected device 200 to gain access to a part of the method/algorithm, whereas the modem part 720 may be provided by a carrier providing the telecommunication circuit access. As shown in FIG. 7B, the WLAN router part 710 and the modem part 720 may be communicatively coupled by an interface 726 (such as a wired Ethernet interface). As shown in FIG. 7B, the platform may be provided by the one or more memories 704A, and the one or more processors 702A, but also additionally, or alternatively, by the one or more memories 704B, and the one or more processors 702B. Instead of the cybersecurity client 252, another component running on the CPE 230 may be configured to run a part of the algorithm implementing the method in some examples.

The CPE 230 may be implemented using proprietary software or using at least partly open software development kits. In an example, the Reference Design Kit for Broadband (RDK-B) may be used, but the implementation is not limited to that as it may be implemented in other applicable environments as well. At the time of writing of this patent application, more information regarding the RDK may be found in wiki.rdkcentral.com. Another alternative implementation environment is Open Wireless Router (OpenWrt®), which is an open-source project for embedded operating systems of the CPE 230 based also on Linux. At the time of writing of this patent application, more information regarding the OpenWrt® may be found in openwrt.org.

As can be understood by the person skilled in the art, the method/algorithm operations may in part be distributed among the distributed software comprising the cybersecurity client 252, and the cybersecurity server 254 in different configurations. In an example, the cybersecurity client 252 communicates 274 with the cybersecurity server 254 to implement the method/algorithm functionality.

Thus, the cybersecurity client 252 may comprise a stand-alone fashion to carry out the method/algorithm, or a part of the functionality augmented by the functionality of the cybersecurity server 254. The cybersecurity client 252 may operate as a frontend with a relatively limited resources as regards to the processor and memory, whereas the cybersecurity server 254 may operate as a backend with a relatively unlimited resources as regards to the processor and memory, and the capability to serve a very large number of the connected devices 200 simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:

intercepting an encrypted hypertext transfer protocol (HTTP) connection between a client and a server, wherein the encrypted HTTP connection comprises a communication session handshake, and an encrypted HTTP request message;

determining a sum length of an unencrypted host and an unencrypted path in the encrypted HTTP request message by subtracting an unencrypted headers length and an encryption constant from a length of the encrypted HTTP request message; and in response to finding a match between the sum length of the unencrypted host and the unencrypted path and a reference sum length in a reference database containing known malicious hosts and paths and their sum lengths, performing a cybersecurity operation in relation to one or more of the client, the server, and the encrypted HTTP connection.

2. The method of claim 1, further comprising:

detecting a version of HTTP based on the encrypted HTTP connection; and determining a packet of the encrypted HTTP request message containing one or more encrypted headers, an encrypted host, and an encrypted path based on the version of the HTTP.

3. The method of claim 1, further comprising:

determining a value for the encryption constant based on the communication session handshake.

4. The method of claim 1, further comprising:

identifying a client of the encrypted HTTP request message and a version of HTTP based on the encrypted HTTP connection.

5. The method of claim 4, further comprising:

determining the unencrypted headers length based on the client and the version of the HTTP.

6. The method of claim 4, wherein identifying the client of the encrypted HTTP request message based on the encrypted HTTP connection further comprises:

identifying the client based on a fingerprint generated with a John Althouse 4 (JA4) algorithm for a client hello message of the communication session handshake.

7. The method of claim 6, wherein the fingerprint comprises a JA4_b field.

8. The method of claim 7, wherein the fingerprint also comprises at least a part of a JA4 a field.

9. The method of claim 1, wherein the reference database comprises sum lengths of hosts and paths of malicious websites.

10. The method of claim 9, wherein the sum lengths of the hosts and the paths of the malicious websites comprise sum lengths of compressed hosts and paths of the malicious websites.

11. The method of claim 1, wherein performing the cybersecurity operation in relation to the one or more of the client, the server, and the encrypted HTTP connection further comprises:

blocking the encrypted HTTP connection in a local area network (LAN).

12. The method of claim 1, further comprising:

in response to detecting an at least partly unencrypted client hello message in the communication session handshake, determining a length of the unencrypted host as a length of a server name indication (SNI) extension in the at least partly unencrypted client hello message, and a length of the unencrypted path by subtracting the length of the SNI extension in the at least partly unencrypted client hello message from the sum length of the unencrypted host and the unencrypted path in the encrypted HTTP request message.

13. The method of claim 1, further comprising:

in response to detecting an encrypted client hello (ECH) message in the communication session handshake, determining a length of an encrypted host as a length of an inner server name indication (SNI) in the ECH message, a path as a slash, and a length of the unencrypted path as one.

14. The method of claim 1, wherein intercepting the encrypted HTTP connection between the client and the server further comprises:

intercepting the encrypted HTTP connection in a local area network (LAN) implemented by an access point.

15. The method of claim 1, wherein the communication session handshake comprises a transport layer security (TLS) session handshake.

16. The method of claim 1, wherein the client is configured to execute in a connected device.

17. The method of claim 1, wherein the server is configured to execute in a computing resource to implement a target website.

18. An apparatus comprising:

one or more memories; and one or more processors coupled to the one or more memories configured to:

intercept an encrypted hypertext transfer protocol (HTTP) connection between a client and a server, wherein the encrypted HTTP connection comprises a communication session handshake, and an encrypted HTTP request message;

determine a sum length of an unencrypted host and an unencrypted path in the encrypted HTTP request message by subtracting an unencrypted headers length and an encryption constant from a length of the encrypted HTTP request message; and in response to finding a match between the sum length of the unencrypted host and the unencrypted path and a reference sum length in a reference database containing known malicious hosts and paths and their sum lengths, perform a cybersecurity operation in relation to one or more of the client, the server, and the encrypted HTTP connection.

19. A non-transitory computer-readable medium comprising a computer program with instructions which, when executed by an apparatus, cause the apparatus to:

intercept an encrypted hypertext transfer protocol (HTTP) connection between a client and a server, wherein the encrypted HTTP connection comprises a communication session handshake, and an encrypted HTTP request message;

determine a sum length of an unencrypted host and an unencrypted path in the encrypted HTTP request message by subtracting an unencrypted headers length and an encryption constant from a length of the encrypted HTTP request message; and in response to finding a match between the sum length of the unencrypted host and the unencrypted path and a reference sum length in a reference database containing known malicious hosts and paths and their sum lengths, perform a cybersecurity operation in relation to one or more of the client, the server, and the encrypted HTTP connection.

* * * * *